United States Patent

Salbaum et al.

Patent Number: 6,131,133
Date of Patent: Oct. 10, 2000

[54] DATA EXCHANGE INTERFACE THAT DIRECTLY TRANSMITS CONTROL SIGNALS EITHER TO A MICROPROCESSOR OR A D.M.A. CONTROLLER VIA A FIRST AND SECOND CONTROL LINE RESPECTIVELY

[75] Inventors: Helmut Salbaum; Rainer Mehling, both of Nürnberg, Germany

[73] Assignee: U.S. Philips Corporation, New York, N.Y.

[21] Appl. No.: 09/123,046

[22] Filed: Jul. 27, 1998

[30] Foreign Application Priority Data

Aug. 2, 1997 [DE] Germany .......................... 197 33 526

[51] Int. Cl.[7] .................................................. G06F 13/00
[52] U.S. Cl. ............................... 710/48; 710/23; 710/107
[58] Field of Search ............................... 710/23, 48, 107, 710/129; 712/225; 711/150

[56] References Cited

U.S. PATENT DOCUMENTS

| 4,458,313 | 7/1984 | Suzuki et al. ............................ 710/23 |
| 4,698,778 | 10/1987 | Ito et al. ................................. 364/518 |
| 4,930,068 | 5/1990 | Katayose et al. ....................... 710/261 |
| 5,027,349 | 6/1991 | Thorne .................................... 370/384 |
| 5,063,498 | 11/1991 | Hirahara et al. ......................... 710/50 |
| 5,481,678 | 1/1996 | Kondo et al. ............................. 710/101 |
| 5,640,517 | 6/1997 | Parks et al. ............................... 395/285 |
| 5,805,842 | 9/1998 | Nagaraj et al. .......................... 395/306 |
| 5,862,387 | 1/1999 | Songer et al. ............................ 395/728 |
| 5,978,865 | 11/1999 | Hansen et al. ............................ 710/22 |

FOREIGN PATENT DOCUMENTS

0422776A2   4/1991   European Pat. Off. .

*Primary Examiner*—Thomas C. Lee
*Assistant Examiner*—Tammara Peyton
*Attorney, Agent, or Firm*—Dicran Halajian

[57] ABSTRACT

A communication system includes a data exchange interface which is coupled via an internal bus to a microprocessor and a DMA unit. For controlling the data exchange, the interface transmits control signals either to a microprocessor or a DMA unit. The control signals are acknowledged each time. For realizing an efficient data exchange via the interface, the interface is an I²C bus interface with minimum load of the microprocessor, and transmits a first group of control signals by a first control line to the DMA unit and a second group of control signals by a second control line to the microprocessor. By respective settings of the interface, a selectable part of the control circuitry may be transferred from the microprocessor to the DMA unit. The total number and type of control signals (interrupts) which correspond each to a specific mode of the interface may be retained.

8 Claims, 1 Drawing Sheet

DATA EXCHANGE INTERFACE THAT DIRECTLY TRANSMITS CONTROL SIGNALS EITHER TO A MICROPROCESSOR OR A D.M.A. CONTROLLER VIA A FIRST AND SECOND CONTROL LINE RESPECTIVELY

FIELD OF THE INVENTION

The invention relates to a communication system with at least one data exchange interface which is coupled to a microprocessor and a DMA unit by at least one internal bus and which, for controlling the data exchange, transmits control signals either to a microprocessor or a DMA unit which control signals are to be acknowledged each time.

Furthermore, the invention also relates to an interface for such a communication system.

BACKGROUND OF THE INVENTION

From EP 0 422 776 is known a communication system for serial data exchange which comprises a microprocessor, a memory, a DMA unit (Direct Memory Access Control unit DMAC) and a serial interface (Serial Communication Control SCC). These function blocks are interconnected by a data bus as shown in FIG. 3 (column 4, lines 6–26). In FIG. 3 with respective description (column 8, line 41 to column 9, line 12) a description is given of how the data (communication line 318) is received by the interface (SCC). Subsequently, under the control of the DMAC, the address information and the message contents of the data packets are written in a specified memory location in the memory via the data bus (310). In this phase, the interface (SCC) does not apply any control signals to the microprocessor. The DMA unit (DMAC) controls the transmission of the data packets from the interface (SCC) to the memory without controlling the operation and thus a possibility of reacting to deviations from the normal operation (column 8, lines 41–47).

This means that the data exchange always takes place in the DMA mode in which the DMA unit controls the transfer to the memory. Since the defined communication system does not have a control line from the interface to the microprocessor, the serial interface cannot be used in the conventional interrupt mode. In an interrupt mode the interface informs the microprocessor by way of a control signal (interrupt) of any change of mode (for example, ready to receive, data received, data sent, addressing/initialization of a transmission on the bus, and so on) during the data exchange. This conventional kind of control of the data exchange, however, causes a considerable load on the microprocessor and on the data bus which can consequently render considerably less capacity available for other purposes (for example, the control of further interfaces). More particularly with high clock rates on the data bus (for example, 400 kbit IIC bus) or large data sequences to be transmitted (for example, for a graphics display) the microprocessor is nearly exclusively busy with processing the interrupt requests of the interface.

SUMMARY OF THE INVENTION

Therefore, it is an object of the invention to provide a communication system which makes an efficient data exchange via an interface possible while loading the microprocessor to a minor extent.

The object is achieved according to the invention in that the interface transmits a first group of control signals by a first control line to a DMA unit and a second group of control signals by a second control line to a microprocessor. The second control line provides a continuous connection of the interface both to the microprocessor and to the DMA unit. As a result, the data exchange is controlled via this interface either only by the microprocessor (interrupt mode) or only by the DMA unit (DMA mode). Appropriate settings of the interface may provide that a selectable part of the control circuitry is transferred from the microprocessor to the DMA unit. It is especially advantageous to have the DMA unit process the group of control signals which do not directly need a post processing or a case distinction, and which frequently occur during a data exchange. The total number and type of control signals (interrupts) which correspond to a certain mode of the interface may be retained.

Advantageous embodiments are defined in the further claims. The interface is then formed by a serial $I^2C$ bus interface (Inter-Integrated Circuit Bus) for exchanging data with an $I^2C$ bus for which the invention is especially suitable. An interface for an $I^2C$ bus (cf. Philips Semiconductors, User Manual 90CL301, pp. 103–138) is always operated in the interrupt mode according to the state of the art, that is to say, the interface transmits control signals always to the microprocessor. Since each change of mode generates an interrupt with a data exchange (for example, data byte sent or received) especially in the case of large data sequences (for example, for a graphics display), the microprocessor is busy processing the interrupt requests from the interface. To provide maximum relief of the microprocessor it is advantageous to transmit to the DMA unit the control signals that do not immediately need a post-processing or immediately need a case distinction, because no immediate microprocessor activity is necessary in that case. The control signals occurring most with a data exchange are assigned to the first group that is transmitted to the DMA unit by a first control line. They are the modes of the interface which relate to the actual transmission and reception of data after the data exchange was initialized (for example, byte transmitted, byte received, data transmitted by the internal bus of the communication system and acknowledge signals for requests from the DMA unit). In contrast, the second group of control signals is transmitted to the microprocessor by a second control line which microprocessor takes over the processing. These control signals are specifically interrupts for the modes in which the interface initializes a transmission by the internal bus, addresses the recipient of the data received by the $I^2C$ bus and signals the end of a data exchange and also acknowledge signals for requests from the microprocessor.

As a result, there is the advantage that even large data sequences can be transmitted fast. Since the data exchange is largely controlled by the DMA unit, no time gaps occur which may be the result of a blocking of the interrupt of the interface by an interrupt having higher priority. In addition, an optimum use of the microprocessor and the bus is achieved in the communication system according to the invention.

BRIEF DESCRIPTION OF THE DRAWINGS

An example of embodiment will be further explained in the following with reference to the Figure.

DETAILED DESCRIPTION OF THE INVENTION

Figure 1:
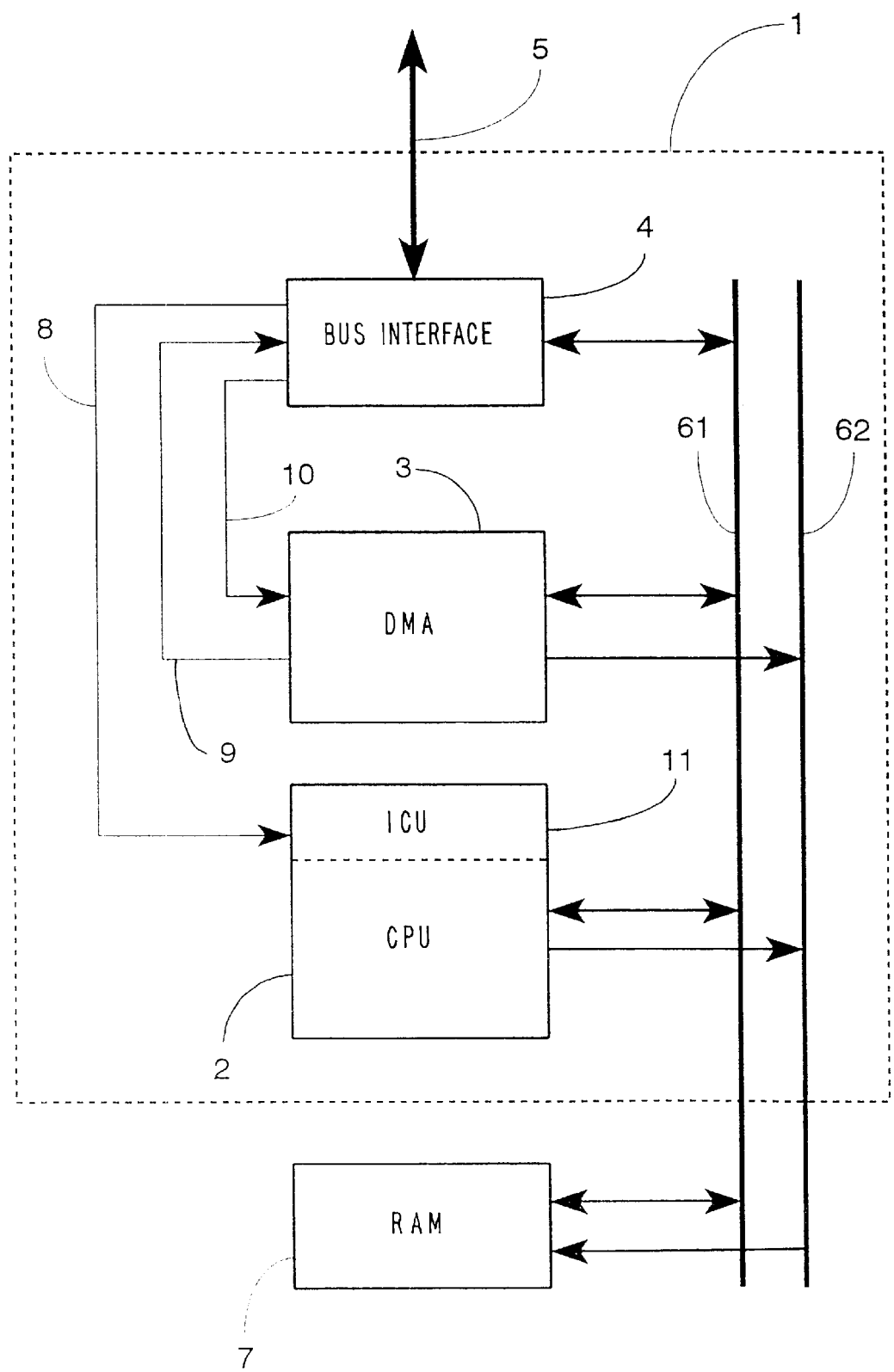
FIG. 1 then shows a block circuit diagram of a communication system according to the invention.

The communication system 1 shown in FIG. 1 comprises a microprocessor (CPU) 2, a DMA unit 3 and an $I^2C$ bus interface 4 which are interconnected by an internal bus comprising an address bus 62 and a data bus 61. With the microprocessor (CPU) 2 is integrated an evaluation unit (Interrupt Control Unit ICU) 11 which is connected to the I²C bus interface 4 by a control line 8. Furthermore, the DMA unit 3 is coupled to the I²C bus interface 4 by control lines 9 and 10. Furthermore, an addressable memory (RAM) 7 is connected to the internal bus. The interface establishes the connection between the communication system 1 and an I²C bus 5.

Data are transmitted by the I²C bus interface 4 and the I²C bus 5 from and to electronic modules (ICs) which have an I²C bus interface while support is given by the CPU 2 and the DMA unit 3. For this purpose, the interface 4 announces with each control signal (interrupt) by the control line 8 when data are received which are sent to the interface 4 by another module. The ICU 11 produces an interrupt vector for each control signal, which interrupt vector is transmitted to the core of the CPU 2. The CPU 2 evaluates the interrupt vector and starts a respective interrupt routine via the start address contained in the interrupt vector. This initializes the data exchange and a memory area in the RAM 7 is addressed in which the received data are stored. With large data sequences such as used, for example, for a graphics display, after the initialization the interface 4 transmits a control signal by the control line 10 to the DMA unit 3 which control signal corresponds to a request for a DMA transfer. The DMA transfer makes it possible to realize a rapid transmission of a received byte by the data bus 61 to the RAM 7, without loading the CPU 2. After the transmission of the byte, the DMA unit 3 transmits a control signal to the interface 4 by the control line 9, which transmission acknowledges that the DMA transfer request is deleted. This program run is repeated with the next byte received by the interface 4 from the I²C bus. When bytes are transmitted on the I²C bus by the interface 4, the bytes buffered in the RAM 7 are transmitted accordingly by the data bus 61.

In this manner, the load of the CPU 2 is greatly reduced because it is no longer necessary for the CPU 2 to react to every control signal (interrupt) from the I²C bus interface 4, but the control signals occurring most are sent from the interface 4 to the DMA unit 3 and processed there. Since an interrupt source (I²C bus interface 4) now uses two control lines, an interrupt is processed and responded either by the CPU 2 or by the DMA unit 3 depending on the mode. With the conventional interrupt control of the I²C bus interface 4 by the CPU 2, about 150 clock cycles are necessary for each byte to be transferred (the number of clock cycles relates to a 68,000 CPU). When the I²C bus interface according to the invention is used, only about 10 clock cycles are necessary for each byte to be transferred. The transfer by the DMA unit 3 provides that there is no interrupt load of the CPU 2 during the transfer, but only the small number of interrupts for the start and stop of the transfer. When, in addition, the DMA unit 3 needs to have the 10 necessary clock cycles in the cycle-steal mode (this is, the CPU 2 does not need the internal buses 61 and 62 and makes the access by other connected function components possible), this leads to an optimum load of data bus 61 and address bus 62. Such interleaving of the bus access by DMA unit 3 and CPU 2 may provide that a data rate of 400 kbit/s can be processed on the I²C bus 5 of the communication system 1.

What is claimed is:

1. A communication system with at least one data exchange interface which is coupled to a microprocessor and a DMA unit by at least one internal bus and which, for controlling data exchange through a first bus connected to the interface, wherein the interface transmits control signals either to the microprocessor or the DMA unit, said control signals being acknowledged each time, and wherein the interface transmits a first group of control signals by a first control line to the DMA unit and a second group of control signals by a second control line to the microprocessor, said first control line and said second control line providing direct connections of the interface to the DMA unit and the microprocessor, respectively.

2. The communication system as claimed in claim 1, wherein the first bus is an I²C bus for the data exchange, and wherein the interface is arranged as a serial I²C bus interface.

3. The communication system as claimed in claim 2, wherein the I²C bus interface forms the first group of control signals from control signals relating to transmission or reception of data by the I²C bus interface during the data exchange.

4. The communication system as claimed in claim 2, wherein the I²C bus interface forms the second group of control signals from the control signals relating to an initialization, an addressing and a termination of the data exchange.

5. A data exchange interface which is coupled to at least one microprocessor and one DMA unit by at least one internal bus, the interface, for controlling data exchange through a first bus connected to the interface, transmitting respective control signals either to the microprocessor or the DMA unit, wherein the interface transmits a first group of control signals by a first control line to the DMA unit and a second group of control signals by a second control line to the microprocessor, said first control line and said second control line providing direct connections of the interface to the DMA unit and the microprocessor, respectively.

6. A communication system comprising:
a local bus;
a memory connected to said local bus;
an interface for data exchange between a first bus and said memory through said local bus;
a direct memory access unit connected to said local bus; and
a processor connected to said local bus;
wherein said interface provides first control signals to said direct memory access unit by a first control line and provides second control signals to said processor by a second control line, said first control line and said second control line providing direct connections of the interface to the direct memory access unit and the microprocessor, respectively.

7. The communication system of claim 6, wherein said first bus is an I²C bus.

8. The communication system of claim 6, wherein said direct memory access unit controls the data exchange after the data exchange is initialized by said processor so that a load of said processor is reduced.

* * * * *